United States Patent
Tanaka (10) Patent No.: US 12,315,927 B2
(45) Date of Patent: May 27, 2025

(54) ALL-SOLID-STATE BATTERY

(71) Applicant: TDK CORPORATION, Tokyo (JP)

(72) Inventor: Teiichi Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 775 days.

(21) Appl. No.: 17/427,725

(22) PCT Filed: Feb. 27, 2020

(86) PCT No.: PCT/JP2020/008075
§ 371 (c)(1),
(2) Date: Aug. 2, 2021

(87) PCT Pub. No.: WO2020/175632
PCT Pub. Date: Sep. 3, 2020

(65) Prior Publication Data
US 2022/0115663 A1 Apr. 14, 2022

(30) Foreign Application Priority Data
Feb. 27, 2019 (JP) .................................. 2019-033411

(51) Int. Cl.
*H01M 4/58* (2010.01)
*H01M 4/136* (2010.01)
(Continued)

(52) U.S. Cl.
CPC ......... *H01M 4/5825* (2013.01); *H01M 4/136* (2013.01); *H01M 4/62* (2013.01);
(Continued)

(58) Field of Classification Search
CPC ...... H01M 4/5825; H01M 4/136; H01M 4/62; H01M 10/0525; H01M 10/0562;
(Continued)

(56) References Cited

U.S. PATENT DOCUMENTS

2007/0202414 A1   8/2007  Yoshida et al.
2008/0311480 A1*  12/2008 Sano ....................... B32B 37/24
                                                                156/281
(Continued)

FOREIGN PATENT DOCUMENTS

JP    2000-086215 A    3/2000
JP    2007-258165 A    10/2007
(Continued)

OTHER PUBLICATIONS

Cui, Min; Wang, Xingyong, Study on preparation and modification of doped lithium vanadium phosphate materials, 2013, Cailiao Daobao Zazhishe, 27(10b), 22-24 (Year: 2013).*

(Continued)

*Primary Examiner* — Maria Laios
*Assistant Examiner* — Ziheng Lu
(74) *Attorney, Agent, or Firm* — Oliff PLC (57) ABSTRACT

An all-solid-state battery includes: a positive electrode collector layer; positive electrode active material layer; solid electrolyte layer; negative electrode active material layer; and a negative electrode collector layer, wherein the positive and negative electrode active material layer contains a positive and negative electrode active material respectively, and the negative electrode active material contains a compound represented by the following general Expression (I): $Li_{a1}V_{b1}Ti_{c1}Al_{d1}(PO_4)_3$ (where, in Expression (I), a1, b1, c1, and d1 indicate numbers in which they satisfy $2.8 \leq a1 < 5$, $0.6 \leq b1 \leq 2$, $0.1 \leq c1 \leq 1.4$, $0 \leq d1 \leq 0.7$, and $1.9 \leq b1+c1+d1 \leq 2.1$); a relationship between a volume CV of positive electrode active material contained in its active material layer and a volume AV of the negative electrode active material contained its active material layer satisfies the following Expression (1): $0.7 \leq CV/AV \leq 3$; and a thickness of the nega- (Continued)

tive electrode active material layer falls within a range of 2 µm or more and 100 µm or less.

16 Claims, 1 Drawing Sheet

(51) Int. Cl.
| | |
|---|---|
| H01M 4/62 | (2006.01) |
| H01M 10/0525 | (2010.01) |
| H01M 10/0562 | (2010.01) |
| H01M 50/431 | (2021.01) |
| H01M 50/449 | (2021.01) |
| H01M 10/42 | (2006.01) |

(52) U.S. Cl.
CPC ... *H01M 10/0525* (2013.01); *H01M 10/0562* (2013.01); *H01M 50/431* (2021.01); *H01M 50/449* (2021.01); *H01M 2010/4292* (2013.01); *H01M 2300/0068* (2013.01); *H01M 2300/0071* (2013.01); *H01M 2300/0094* (2013.01)

(58) Field of Classification Search
CPC ............. H01M 50/431; H01M 50/449; H01M 2010/4292; H01M 2300/0068; H01M 2300/0071
See application file for complete search history.

(56) References Cited

U.S. PATENT DOCUMENTS

| | | | |
|---|---|---|---|
| 2009/0123846 A1* | 5/2009 | Okada | H01M 10/0525 |
| | | | 429/304 |
| 2009/0246612 A1 | 10/2009 | Naoi et al. | |
| 2016/0141713 A1* | 5/2016 | Suzuki | H01M 10/0585 |
| | | | 29/623.5 |
| 2018/0316057 A1* | 11/2018 | Sasaki | H01M 4/625 |
| 2019/0252720 A1* | 8/2019 | Sato | H01M 4/136 |
| 2020/0395619 A1 | 12/2020 | Tanaka et al. | |

FOREIGN PATENT DOCUMENTS

| | | |
|---|---|---|
| JP | 2009-238487 A | 10/2009 |
| JP | 2018-147602 A | 9/2018 |
| WO | 2018/062085 A1 | 4/2018 |
| WO | 2019/167783 A1 | 9/2019 |

OTHER PUBLICATIONS

Translation of Jun. 29, 2023 Office Action issued in Chinese Patent Application No. 202080016587.9.
May 26, 2020 International Search Report issued in International Patent Application No. PCT/JP2020/008075.

* cited by examiner

ALL-SOLID-STATE BATTERY

TECHNICAL FIELD

The present invention relates to an all-solid-state battery.
Priority is claimed on Japanese Patent Application No. 2019-33411, filed Feb. 27, 2019, the content of which is incorporated herein by reference.

BACKGROUND ART

In recent years, the advancement in electronics technology has been remarkable, and the size, weight, and thickness of portable electronic devices are being reduced while their functionality is being increased. Along with this, there is a strong demand for batteries which can be used as power sources for electronic devices to be smaller, lighter, thinner, and more reliable. Currently, in lithium ion secondary batteries which are generally used, electrolytes (electrolyte solutions) such as organic solvents are being used as a medium for moving ions. However, in batteries having the above constitution, there is a risk concerning leakage of electrolyte solutions. Furthermore, since organic solvents and the like used in electrolyte solutions are flammable substances, batteries with higher safety are required.

Thus, as one measure for improving the safety of batteries, utilizing solid electrolytes as electrolytes instead of electrolyte solutions has been proposed. In addition, the development of all-solid-state batteries in which solid electrolytes are used as electrolytes and other constituent elements are also composed of solids is underway.

On the other hand, all-solid-state batteries generally have lithium ion conductivities lower than those of lithium ion secondary batteries in which organic electrolyte solutions are used. In addition, adding conductive auxiliary agents to active materials is not easy, and the electron conductivities of active material layers are low.

Thus, all-solid-state batteries have higher internal resistances and poorer charging/discharge rate characteristics than lithium ion secondary batteries in which organic electrolyte solutions are used. Thus, in order to reduce the internal resistance, designing battery structures so that thicknesses of active material layers and solid electrolyte layers are reduced is required. Therefore, there is a problem in that proportions of active materials which are responsible for the capacities of all-solid-state batteries contained in all-solid-state batteries are reduced and the discharge capacity per unit volume is reduced. Accordingly, in all-solid-state batteries, improving the discharge capacity per unit volume while reducing the internal resistance is required.

Patent Literature 1 describes that polyanion compounds are used for a positive electrode active material, a negative electrode active material, and a solid electrolyte of an all-solid-state battery and that an element group (X) which is a polyanion constituting each of the positive electrode active material, the negative electrode active material, and the solid electrolyte is common thereto. According to Patent Literature 1, it can be said that, when the element group (X) which is a polyanion is common, the mutual ionic conductivity of the positive electrode, the negative electrode, and the solid electrolyte layer is improved, a large current can be extracted, and the charge/discharge cycle characteristics are improved.

In an all-solid-state battery, improving the discharge capacity per unit volume is required, and in order to realize this, improving the electron conductivity of an active material layer is required.

However, in the all-solid-state battery described in Patent Literature 1, a sufficient electron conductivity is not provided for the active material, and improving the discharge capacity per unit volume is not easy.

CITATION LIST

Patent Literature

Patent Literature 1: Japanese Unexamined Patent Application, First Publication No. 2007-258165

SUMMARY OF INVENTION

Technical Problem

The present invention was made to solve the above problems, and an object of the present invention is to provide an all-solid-state battery having an excellent discharge capacity per unit volume by improving the electron conductivity of an active material constituting the all-solid-state battery.

Solution to Problem

In order to solve the above problems, the following means are provided.

(1) An all-solid-state battery according to a first aspect includes: a positive electrode collector layer; a positive electrode active material layer; a solid electrolyte layer; a negative electrode active material layer; and a negative electrode collector layer, and is characterized in that the positive electrode active material layer contains a positive electrode active material, the negative electrode active material layer contains a negative electrode active material, and the negative electrode active material contains, as a main component, a compound represented by the following general Expression (I):

$$\text{Li}_{a1}\text{V}_{b1}\text{Ti}_{c1}\text{Al}_{d1}(\text{PO}_4)_3 \quad (I)$$

(where, in Expression (I), a1, b1, c1, and d1 indicate numbers in which $2.8 \leq a1 < 5$, $0.6 \leq b1 \leq 2$, $0.1 \leq c1 \leq 1.4$, $0 \leq d1 \leq 0.7$, and $1.9 \leq b1+c1+d1 \leq 2.1$ are satisfied);

a relationship between a volume CV of the positive electrode active material contained in the positive electrode active material layer and a volume AV of the negative electrode active material contained in the negative electrode active material layer satisfies the following Expression (1):

$$0.7 \leq CV/AV \leq 3 \quad (1); \text{ and}$$

a thickness of the negative electrode active material layer falls within a range of 2 μm or more and 100 μm or less.

(2) In the all-solid-state battery according to the aspect, the positive electrode active material may contain, as a main component, a compound represented by the following general Expression (II):

$$\text{Li}_{a2}\text{V}_{b2}\text{Ti}_{c2}\text{Al}_{d2}(\text{PO}_4)_3 \quad (II)$$

(where, in Expression (II), a2, b2, c2, and d2 indicate numbers in which $1 < a2 \leq 3.2$, $1 \leq b2 \leq 2$, $0.1 \leq c2 \leq 1$, $0 \leq d2 \leq 0.4$, and $1.9 \leq b2+c2+d2 \leq 2.1$ are satisfied).

(3) In the all-solid-state battery according to the aspect, a relationship between a weight CW of the positive electrode active material contained in the positive electrode active material layer and a weight AW of the negative electrode active material contained in the negative electrode active material layer may satisfy the following Expression (2):

$$0.75 \leq R \leq 1.25 \quad (2)$$

$$R=CW/\{((b1+c1)/(b1+c1+d1))\times((b2+c2+d2)/b2)\times AW\}$$

(where b1, c1, and d1 indicate the same numbers as b1, c1, and d1 in the foregoing general Expression (I) and b2, c2, and d2 indicate the same numbers as b2, c2, and d2 in the foregoing general Expression (II)).

(4) In the all-solid-state battery according to the aspect, the solid electrolyte layer may contain a solid electrolyte, and the solid electrolyte may contain, as a main component, any one of titanium aluminum lithium phosphate, lithium zirconium phosphate, and garnet-type zirconate.

(5) In the all-solid-state battery according to the aspect, a relationship between an area S1 of a portion of the negative electrode active material layer in contact with the solid electrolyte layer and an area S2 of a portion of the positive electrode active material layer in contact with the solid electrolyte layer may satisfy the following Expression (3):

$$S1/S2 > 1 \quad (3).$$

(6) In the all-solid-state battery according to the aspect, the all-solid-state battery may include: a first intermediate layer between the positive electrode active material layer and the solid electrolyte layer; and a second intermediate layer between the negative electrode active material layer and the solid electrolyte layer.

(7) In the all-solid-state battery according to the aspect, the first intermediate layer and the second intermediate layer may contain at least one element selected from the group consisting of Li, Al, Ti, V, Zr, and P.

Advantageous Effects of Invention

According to the present invention, it is possible to provide an all-solid-state battery having an excellent discharge capacity per unit volume by improving the electron conductivity of an active material constituting the all-solid-state battery.

DESCRIPTION OF EMBODIMENTS

Preferred embodiments according to an all-solid-state battery of the present invention will be described in detail below with reference to the drawing as appropriate. In the drawing used in the following description, in order to make the features of the present invention easy to understand, enlarged featured portions may be provided for convenience in some cases. Therefore, the dimensional ratios of constituent elements illustrated in the drawing may differ from the actual ones in some cases. The materials, the dimensions, and the like exemplified in the following description are examples, the present invention is not limited thereto, and the present invention can be appropriately modified without changing the gist thereof.

Figure 1:
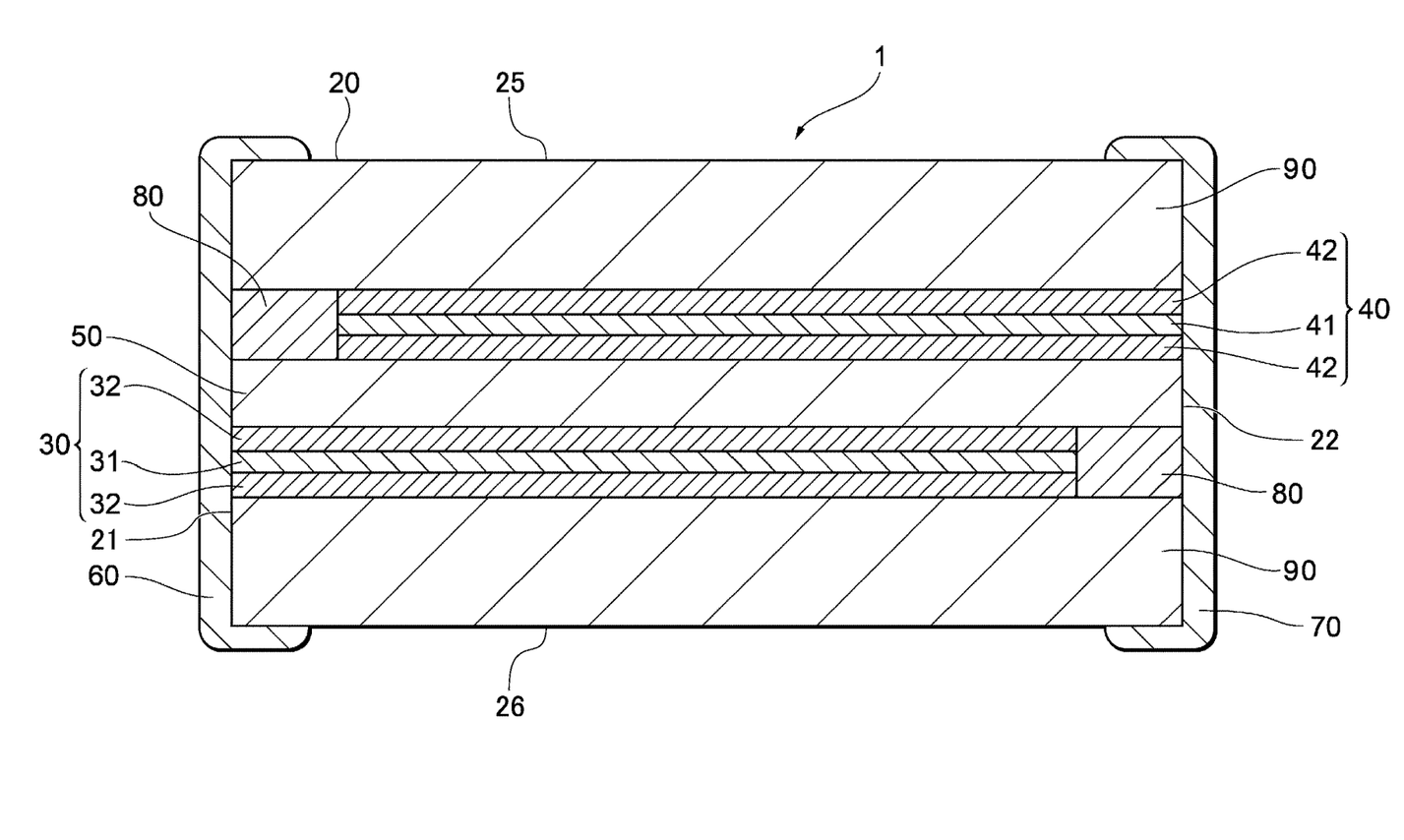
FIG. 1 is a schematic cross-sectional view illustrating a constitution of an all-solid-state battery according to an embodiment of the present invention.

As illustrated in FIG. 1, an all-solid-state battery 1 includes a laminate body 20 having a positive electrode 30 and a negative electrode 40 laminating a solid electrolyte layer 50 therebetween. The positive electrode 30 includes a positive electrode collector layer 31 and a positive electrode active material layer 32. The negative electrode 40 includes a negative electrode collector layer 41 and a negative electrode active material layer 42. A margin layer 80 is formed at the same level as that of the positive electrode 30 and the negative electrode 40. A laminate body 20 is a hexahedron and has two end surfaces (a first end surface 21 and a second end surface 22) and two side surfaces (a first side surface and a second side surface) formed as surfaces parallel to a lamination direction and an upper surface 25 and a lower surface 26 formed as surfaces orthogonal to the lamination direction. The positive electrode collector layer 31 is exposed in the first end surface 21, and the negative electrode collector layer 41 is exposed in the second end surface 22. The first side surface is a side surface on the right side when viewed from the first end surface 21 side with the upper surface 25 directed upward, and the second side surface is a side surface on the left side when viewed from the first end surface 21 side with the upper surface 25 directed upward. Furthermore, the first end surface 21 and the second end surface 22 face each other, and the first side surface and the second side surface face each other. As will be described later, the positive electrode collector layer 31 and the negative electrode collector layer 41 are also exposed in the first side surface and the second side surface.

A positive electrode external electrode 60 electrically connected to the positive electrode collector layer 31 is attached to cover the first end surface 21 side of the laminate body 20. This electrical connection is provided by connecting the positive electrode external electrode 60 to the positive electrode collector layer 31 of the positive electrode 30 exposed in the first end surface 21, the first side surface, and the second side surface of the laminate body 20.

A negative electrode external electrode 70 electrically connected to the negative electrode collector layer 41 is attached to cover the second end surface 22 side of the laminate body 20. This electrical connection is provided by connecting the negative electrode external electrode 70 to the negative electrode collector layer 41 of the negative electrode 40 exposed in the second end surface 22, the first side surface, and the second side surface of the laminate body 20.

The margin layer 80 of the all-solid-state battery 1 in the embodiment can be provided to eliminate a step between the solid electrolyte layer 50 and the positive electrode 30 and a step between the solid electrolyte layer 50 and the negative electrode 40. Therefore, the margin layer 80 is formed on a region other than that of the positive electrode 30 and the negative electrode 40 and is present on the same level as the positive electrode 30 and the negative electrode 40. Since the presence of such a margin layer 80 eliminates steps between the solid electrolyte layer, the positive electrode, and the negative electrode, the denseness between the solid electrolyte layer and the electrode layers increases, and delamination and warpage due to firing of the all-solid-state battery does not easily occur. It is preferable that a distance (a distance in a direction orthogonal to the lamination direction) from the positive electrode 30 and the negative electrode 40 of the margin layer 80 to the first end surface 21, the first side surface, and the second side surface of the laminate body 20 be 10 to 1000 μm.

Outer layers 90 can be provided on the uppermost surface and the lowermost surface of the laminate body 20, respectively. A thickness of the outer layers 90 is, preferably, for example, 10 to 1000 μm.

(Solid Electrolyte Layer)

The solid electrolyte layer 50 contains a solid electrolyte. The solid electrolyte used in the solid electrolyte layer 50 of the all-solid-state battery 1 in the embodiment may contain titanium aluminum lithium phosphate. Titanium aluminum lithium phosphate is preferably $Li_{1+z}Al_zTi_{2-z}(PO_4)_3$ (0≤z≤0.6). Furthermore, the solid electrolyte layer 50 may contain a solid electrolyte other than titanium aluminum lithium phosphate. For example, it is preferable that at least one selected from the group consisting of $Li_{3+z1}Si_{z1}P_{1-z1}O_4$ (0.4≤z1≤0.6), $Li_{3.4}V_{0.4}Ge_{0.6}O_4$, germanium phosphate lithium ($LiGe_2(PO_4)_3$), $Li_2OV_2O_5$—$SiO_2$, $Li_2O$—$P_2O_5$—$B_2O_3$, $Li_3PO_4$, $Li_{0.5}La_{0.5}TiO_3$, $Li_{14}Zn(GeO_4)_4$, lithium zirconium phosphate, and garnet-type zirconate ($Li_7La_3Zr_2O_{12}$) be contained. These solid electrolytes may be used independently or in a combination of two or more. It is preferable that the solid electrolyte contain any one of titanium aluminum lithium phosphate, lithium zirconium phosphate, and garnet-type zirconate as a main component. This means that the main component is contained in the solid electrolyte in an amount of 50 volume % or more, and preferably 60 volume % or more.

(Negative Electrode Active Material Layer)

The negative electrode active material layer 42 contains a negative electrode active material. The negative electrode active material used for the negative electrode active material layer 42 of the all-solid-state battery 1 in the embodiment contains, as a main component, a compound represented by the following general Expression (I) (this compound may be hereinafter referred to as "LVTP (negative)"). This means that the main component is contained in a negative electrode active material in an amount of 50 volume % or more, and preferably 60 volume % or more:

$$Li_{a1}V_{b1}Ti_{c1}Al_{d1}(PO_4)_3 \quad (I)$$

(where, in Expression (I), a1, b1, c1, and d1 indicate numbers in which they satisfy 2.8≤a1<5, 0.6≤b1≤2, 0.1≤c1≤1.4, 0≤d1≤0.7, and 1.9≤b1+c1+d1≤2.1).

A thickness of the negative electrode active material layer 42 (a thickness in the lamination direction) is preferably 2 to 100 μm. When "LVTP (negative)" is used as the negative electrode active material and the thickness of the negative electrode active material layer 42 falls within the above range, the electron conductivity of the negative electrode active material layer 42 is improved.

In the related art, in order to improve the electron conductivity of the negative electrode active material layer 42, a thickness of the negative electrode active material layer 42 is reduced. Furthermore, adding a conductive auxiliary agent to the negative electrode active material layer 42 has been studied. In this case, increasing the proportion of the active material which is responsible for the electrical capacity of the all-solid-state battery 1 contained in the all-solid-state battery is not easy, and increasing the discharge capacity per unit volume is not easy.

For example, "LVTP (negative)" corresponds to a substance obtained by replacing V of lithium vanadium phosphate (LVP: $Li_3V_2(PO_4)_3$) used as the negative electrode active material and the positive electrode active material in the related art with Ti or Ti and Al. Ti is an element which more easily becomes a divalent ion than V. For this reason, oxygen deficiency in a crystal lattice of "LVTP (negative)" easily occurs, and the occurrence of oxygen deficiency causes free electrons. Thus, the electron conductivity of the negative electrode active material ("LVTP (negative)") itself can increase.

For "LVTP (negative)," the electron conductivity tends to be improved by increasing an amount of Ti which is substituted. However, if the amount of Ti which is substituted is increased too much, the electron conductivity may decrease in some cases. It is thought that this is because a structure becomes stable and oxygen deficiencies do not readily occur when a Ti component proportion becomes the main component. Therefore, an atomic ratio (a substitution amount) c1 of Ti is a number in which 0.1≤c1≤1.4 is satisfied. c1 is more preferably a number in which 0.1≤c1≤1.0 is satisfied, and still more preferably a number in which 0.1≤c1≤0.7 is satisfied.

Also, an atomic ratio (a substitution amount) d1 of Al of "LVTP (negative)" is set to 0≤d1≤0.7. Since a structure of "LVTP (negative)" is stabilized and a concentration of Li ions can be improved through substitution of Al, the ionic conductivity tends to be improved. However, if the amount of Al to be substituted increases too much, an unstable structure of "LVTP (negative)" is provided, and amounts of V and Ti which are responsible for the discharge capacity decrease. Thus, there is a concern regarding a decrease in the discharge capacity. In view of these factors, the atomic ratio (the substitution amount) d1 of Al is set to 0<d1≤0.7.

An atomic ratio a1 of Li of "LVTP (negative)" is a value which can be obtained by intercalating and deintercalating Li through charging and discharging of the all-solid-state battery. If (c1+d1) is assumed as x and d1 is assumed as a, an atomic ratio b1 of V, the atomic ratio (the substitution amount) c1 of Ti, and the atomic ratio (the substitution amount) d1 of Al of "LVTP (negative)" can be represented as follows:

$$b1=2-(c1+d1)=2-x$$

$$c1=(c1+d1)-d1=x-a.$$

"LVTP (negative)" includes a compound represented by the following Expression (I)':

$$Li_{3+a}V_{2-x}Ti_{x-a}Al_a(PO_4)_3 \quad (I)'$$

(where, 0<x−a≤1.4 and 0≤a≤0.7).

When "LVTP (negative)" is used, the electron conductivity of the negative electrode active material layer 42 is improved, and a chemical reaction in the negative electrode active material layer 42 can be smoothly performed. For this reason, a thickness of the negative electrode active material layer 42 can be increased. Furthermore, an amount of conductive auxiliary agent in the negative electrode active material layer 42 is reduced. Thus, a proportion of the negative electrode active material which is responsible for the electric capacity of the all-solid-state battery 1 included in the all-solid-state battery 1 can be increased, and the discharge capacity per unit volume of the all-solid-state battery 1 can be improved. Moreover, when the thickness of the negative electrode active material layer 42 is set to 2 μm to 100 μm, it is possible to effectively reduce the amount of the conductive auxiliary agent and to increase a proportion of the active material which is responsible for the capacity of the all-solid-state battery 1 included in the all-solid-state battery 1. For this reason, it is possible to effectively improve the discharge capacity per unit volume of the all-solid-state battery 1.

(Positive Electrode Active Material Layer)

The positive electrode active material layer 32 contains a positive electrode active material. It is preferable that the positive electrode active material used for the positive electrode active material layer 32 of the all-solid-state battery 1 in the embodiment contain, as a main component, a compound (this compound may be hereinafter referred to as "LVTP (positive)" in some cases) represented by the following general Expression (II). This means that the main component is contained in the positive electrode active material in an amount of 50 volume % or more, and preferably 60 volume % or more:

$$\text{Li}_{a2}\text{V}_{b2}\text{Ti}_{c2}\text{Al}_{d2}(\text{PO}_4)_3 \tag{II}$$

(where, in Expression (II), a2, b2, c2, and d2 indicate numbers in which $1<a2\leq3.2$, $1\leq b2\leq2$, $0.1\leq c2\leq1$, $0\leq d2\leq0.4$, and $1.9\leq b2+c2+d2\leq2.1$ are satisfied).

An atomic ratio a2 of Li of "LVTP (positive)" is a value which can be obtained by intercalating and deintercalating Li through charging and discharging of the all-solid-state battery. If (c2+d2) is assumed as y and d2 is assumed as b, an atomic ratio b2 of V, an atomic ratio (a substitution amount) c2 of Ti, and an atomic ratio (a substitution amount) d2 of Al of "LVTP (positive)" can be represented as follows:

$$b2=2-(c2+d2)=2-y$$

$$c2=(c2+d2)-d2=y-b.$$

"LVTP (positive)" includes a compound represented by the following Expression (II)':

$$\text{Li}_{3+b}\text{V}_{2-y}\text{Ti}_{y-b}\text{Al}_b(\text{PO}_4)_3 \tag{II)'}$$

(where, $0.1\leq y-b\leq1.0$ and $0\leq b\leq0.4$).

That is to say, it is preferable that the positive electrode active material layer 32 contain "LVTP (positive)" containing the same element as "LVTP (negative)" which is a main component of the negative electrode active material layer 42.

(Positive Electrode Active Material Layer and Negative Electrode Active Material Layer)

The positive electrode active material layer 32 and the negative electrode active material layer 42 may contain a positive electrode active material and a negative electrode active material other than "LVTP (positive)" and "LVTP (negative)". For example, it is preferable to include a transition metal oxide or a transition metal composite oxide. To be specific, any of composite metal oxides represented by a lithium manganese composite oxide $\text{Li}_2\text{Mn}_{x3}\text{Ma}_{1-x3}\text{O}_3$ ($0.8\leq x3\leq1$, Ma=Co or Ni), lithium cobalt oxide ($\text{LiCoO}_2$), lithium nickelate ($\text{LiNiO}_2$), lithium manganese spinel ($\text{LiMn}_2\text{O}_4$), and a general expression: $\text{LiNi}_{x4}\text{Co}_{y4}\text{Mn}_{z4}\text{O}_2$ ($x4+y4+z4=1$, $0\leq x4\leq1$, $0\leq y4\leq1$, and $0\leq z4\leq1$) and composite metal oxides represented by a lithium vanadium compound ($\text{LiV}_2\text{O}_5$), an olivine type $\text{LiMbPO}_4$ (where, Mb is one or more elements selected from Co, Ni, Mn, Fe, Mg, Nb, Ti, Al, and Zr), Li-excess solid solution positive electrodes $\text{Li}_2\text{MnO}_3$—$\text{LiMcO}_2$ (Mc=Mn, Co, and Ni), lithium titanate ($\text{Li}_4\text{Ti}_5\text{O}_{12}$), and $\text{Li}_a\text{Ni}_{x5}\text{Co}_{y5}\text{Al}_{z5}\text{O}_2$ ($0.9<a<1.3$, $0.9<x5+y5+z5<1.1$) is preferable.

Here, there is no clear distinction between the active materials constituting the positive electrode active material layer 32 or the negative electrode active material layer 42. In addition, when the potentials of two compounds which are a compound in the positive electrode active material layer 32 and a compound in the negative electrode active material layer 42 are compared, a compound showing a more noble potential can be used as a positive electrode active material and a compound showing a less noble potential can be used a negative electrode active material. Furthermore, the same compound may be used for the positive electrode active material layer 32 and the negative electrode active material layer 42 as long as the compound is capable of both lithium ion release and lithium ion occlusion at the same time.

A relationship between a volume CV of the positive electrode active material contained in the positive electrode active material layer 32 and a volume AV of the negative electrode active material contained in the negative electrode active material layer 42 is set to satisfy the following Expression (1):

$$0.7\leq CV/AV\leq3 \tag{1}.$$

The volume CV of the positive electrode active material contained in the positive electrode active material layer 32 and the volume AV of the negative electrode active material contained in the negative electrode active material layer 42 are calculated using a scanning electron microscope (SEM) image captured using an SEM.

The volume AV and the volume CV can be measured, for example, as follows. The all-solid-state battery is disassembled, and the number of layers AN of the negative electrode active material layer 42 and the number of layers CN of the positive electrode active material layer 32 are measured. Subsequently, an area S1 of a portion of the negative electrode active material layer 42 in contact with the solid electrolyte layer 50 (a surface parallel to a lamination surface in which the negative electrode active material layer 42 is in contact with the solid electrolyte layer 50) is measured. The area S1 is calculated by measuring vertical and horizontal lengths of a surface parallel to the lamination surface of the negative electrode active material layer 42 and multiplying the obtained vertical length by the obtained horizontal length. Similarly, an area S2 of a portion of the positive electrode active material layer 32 in contact with the solid electrolyte layer 50 (a surface parallel to a lamination surface in which the positive electrode active material layer 32 is in contact with the solid electrolyte layer 50) is measured. Subsequently, a thickness t1 of the negative electrode active material layer 42 is measured. The thickness t1 is measured using an SEM image of a cross section perpendicular to the lamination surface of the negative electrode active material layer 42. The SEM image can be obtained, for example, by polishing the negative electrode active material layer 42 in a state of being embedded in a resin to expose a cross section of the negative electrode active material layer 42 and observing the exposed cross section using the SEM. Similarly, a thickness t2 of the positive electrode active material layer 32 is measured. Subsequently, a ratio R1 occupied by the negative electrode active material of the negative electrode active material layer 42 is calculated. The ratio R1 is calculated by binarizing the SEM image into the negative electrode active material and the other portion through image processing. Similarly, a ratio R2 occupied by the positive electrode active material of the positive electrode active material layer 32 is calculated.

Also, the volume AV is calculated from the expression: $AV=S1\times t1\times R1\times AN$.

Similarly, the volume CV is calculated from the expression:

$$CV=S2\times t2\times R2\times CN.$$

A volume-based content of the positive electrode active material contained in the positive electrode active material layer 32 is preferably 40 to 100%, and more preferably 70 to 100%. Furthermore, a volume-based content of the negative electrode active material contained in the negative electrode active material layer 42 is preferably 40 to 100%, and more preferably 70 to 100%.

It is preferable that a weight (a mass) CW of the positive electrode active material contained in the positive electrode active material layer 32 and a weight (a mass) AW of the negative electrode active material contained in the negative electrode active material layer 42 satisfy the following Expression (2):

$$0.75 \le R \le 1.25$$

$$R = CW/\{((b1+c1)/(b1+c1+d1)) \times ((b2+c2+d2)/b2) \times AW\} \quad (2)$$

(where, b1, c1, and d1 are the same numbers as b1, c1, and d1 in the foregoing general Expression (I), respectively, and b2, c2, and d2 are the same numbers as b2, c2, and d2 in the foregoing general Expression (II), respectively).

A weight AW of the negative electrode active material contained in the negative electrode active material layer 42 can be calculated, for example, by multiplying the volume AV stated above by a density of the negative electrode active material. The density of the negative electrode active material can be obtained from, for example, a composition and a crystal structure of the negative electrode active material. The composition of the negative electrode active material can be measured, for example, using an energy dispersive type X-ray analysis method (EDX), a fluorescent X-ray analysis method (XRF), or a laser ablation ICP mass analysis method (LA-ICP-MS). For example, an X-ray diffraction method (XRD) can be used for the crystal structure. A weight CW of the positive electrode active material contained in the positive electrode active material layer 32 can be measured in the same manner as in the weight AW described above.

b1, c1, and d1 are atomic ratios of V, Ti, and Al of the negative electrode active material represented by the general Expression (1). b1, c1, and d1 can be obtained, for example, by analyzing the composition of the negative electrode active material, calculating atomic ratios of Li, V, Ti, Al, and P, and obtaining atomic ratios of Li, V, Ti, and Al when phosphorous (P) is set to 3. b2, c2, and d2 are atomic ratios of V, Ti, and Al of the positive electrode active material represented by the general Expression (IT). b2, c2, and d2 can be obtained in the same manner as in b1, c1, and d1 described above.

The design capacities per unit weight of LVTP (negative) and LVTP (positive) have the following characteristics. For LVTP (negative), Li ions are inserted by a valence of Ti changing in accordance with a change in valence of V at the time of charging (at the time of inserting Li ions). For this reason, for LVTP (negative), the design capacity of the negative electrode active material per unit weight does not change. On the other hand, for LVTP (positive), a change in valence of V is required, and an amount of V is reduced due to the substitution of Ti at the time of charging (at the time of deintercalating Li ions). Thus, for LVTP (positive), an amount of Li ions which can be deintercalated is reduced, and the design capacity of the positive electrode active material per unit weight is reduced.

Therefore, in order to improve the discharge capacity per unit volume, excess active materials of the positive electrode active material layer 32 and the negative electrode active material layer 42 which are extra volumes regardless of the discharge capacity need to be reduced, and the design capacities of the positive electrode active material layer 32 and the negative electrode active material layer 42 need to be about the same.

The design capacity of the negative electrode active material per unit weight is represented by $(b1+c1)/(b1+c1+d1) \times 132$ [mAh/g], and the design capacity of the positive electrode active material per unit weight is represented by $b2/(b2+c2+d2) \times 132$ [mAh/g]. The design capacity of each active material layer is represented by a weight of an active material contained in each active material layer×the design capacity per unit weight of each active material. For this reason, when the design capacity of the positive electrode active material layer 32 is set to 75% to 125% of the design capacity of the negative electrode active material layer, volumes occupied by excess active materials in the positive electrode active material layer 32 and the negative electrode active material layer 42 are reduced, and the discharge capacity per unit volume is improved. This relationship is represented by an expression of $0.75 \le R \le 1.25$ [where, $R = CW/\{((b1+c1)/(b1+c1+d1)) \times ((b2+c2+d2)/b2) \times AW)\}$].

When d1 of the negative electrode active material represented by the general Expression (I) is 0, b1+c1=2 is satisfied, d2 of the positive electrode active material represented by the general Expression (II) is 0, and b2+c2=2 is satisfied, $$R = CW/\{(2/2) \times 2/(2-c2) \times AW\} = CW/\{2/(2-c2) \times AW\}.$$

Also, it is preferable that a relationship between the area S1 of the portion of the negative electrode active material layer in contact with the solid electrolyte layer and the area S2 of the portion of the positive electrode active material layer in contact with the solid electrolyte layer satisfy the following Expression (3):

$$S1/S2 > 1 \quad (3)$$

(Positive Electrode Current Collector and Negative Electrode Current Collector)

As the material constituting the positive electrode collector layer and the negative electrode collector layer of the all-solid-state battery in the embodiment, it is preferable to utilize a material having high conductivity, for example, silver, palladium, gold, platinum, aluminum, copper, nickel, or the like. Particularly, copper is more preferable because it does not easily react with titanium aluminum lithium phosphate and has an effect of reducing the internal resistance of the all-solid-state battery. The material constituting the positive electrode collector layer and the negative electrode collector layer may be the same for the positive electrode and the negative electrode or may be different.

Also, it is preferable that the positive electrode collector layer 31 and the negative electrode collector layer 41 of the all-solid-state battery 1 in the embodiment contain a positive electrode active material and a negative electrode active material.

When the positive electrode collector layer 31 and the negative electrode collector layer 41 contain a positive electrode active material and a negative electrode active material, this is preferable because in this case, adhesion of the positive electrode collector layer 31 and the positive electrode active material layer 32 to the negative electrode collector layer 41 and the negative electrode active material layer 42 is improved.

Although the ratio of the positive electrode collector layer and the negative electrode collector layer to the positive electrode active material and the negative electrode active material in the embodiment is not particularly limited as long as it functions as a current collector, the positive electrode current collector and the positive electrode active material or the negative electrode current collector and the negative electrode active material are preferably within a range of 90/10 to 70/30 in a volume ratio.

(Margin Layer)

It is preferable that the material constituting the margin layer contain, for example, titanium aluminum lithium phosphate, which is the same material as in the solid electrolyte layer. Therefore, it is preferable that titanium aluminum lithium phosphate be $Li_{1+z}Al_zTi_{2-z}(PO_4)_3$ ($0 \le z \le 0.6$). Furthermore, the solid electrolyte layer may contain a solid electrolyte material other than titanium aluminum lithium phosphate. For example, it is preferable to include at least one selected from the group consisting of $Li_{3+z1}Si_{z1}P_{1-z1}O_4$ ($0.4 \le z1 \le 0.6$), $Li_{3.4}V_{0.4}Ge_{0.6}O_4$, germanium phosphate lithium ($LiGe_2(PO_4)_3$), $Li_2OV_2O_5$—$SiO_2$, $Li_2O$—$P_2O_5$—$B_2O_3$, $Li_3PO_4$, $Li_{0.5}La_{0.5}TiO_3$, $Li_{14}Zn(GeO_4)_4$, and $Li_7La_3Zr_2O_{12}$.

(Outer Layers)

The outer layers 90 contain titanium aluminum lithium phosphate, as in the solid electrolyte layer 50. It is preferable that titanium aluminum lithium phosphate be $Li_{1+z}Al_zTi_{2-z}(PO_4)_3$ ($0 \le z \le 0.6$). Furthermore, the outer layers 90 may contain a solid electrolyte material or a vitreous material other than titanium aluminum lithium phosphate. For example, it is preferable that the solid electrolyte material contain at least one selected from the group consisting of $Li_{3+z1}Si_{z1}P_{1-z1}O_4$ ($0.4 < z1 \le 0.6$), $Li_{3.4}V_{0.4}Ge_{0.6}O_4$, germanium phosphate lithium ($LiGe_2(PO_4)_3$), $Li_2OV_2O_5$—$SiO_2$, $Li_2O$—$P_2O_5$—$B_2O_3$, $Li_3PO_4$, $Li_{0.5}La_{0.5}TiO_3$, $Li_{14}Zn(GeO_4)_4$, and $Li_7La_3Zr_2O_{12}$ and that the vitreous material contain at least one selected from the group consisting of silica-based glass and zinc-based glass.

(External Electrode)

Moreover, it is preferable that the positive electrode external electrode 60 and the negative electrode external electrode 70 mainly contain at least one conductive metal made of Au, Ag, Cu, Ni, Al, or the like. Furthermore, it is preferable to include a glass material or a resin component to improve the adhesiveness between the external electrodes and the laminate body 20.

(Method for Preparing Positive Electrode Active Material and Negative Electrode Active Material)

The positive electrode active material $Li_{a2}V_{b2}Ti_{c2}Al_{d2}(PO_4)_3$ and the negative electrode active material $Li_{a1}V_{b1}Ti_{c1}Al_{d1}(PO_4)_3$ can be prepared using the following methods. Wet mixing is performed using $Li_2CO_3$, $V_2O_5$, $TiO_2$, $Al_2O_3$, and $NH_4H_2PO_4$ as starting materials with a ball mill for 16 hours, and the powder obtained after drying in a desiccator is calcined at 850° C. for 2 hours in a nitrogen-hydrogen mixed gas. Subsequently, the obtained calcined product is wet-pulverized with a ball mill and then dried in a desiccator to obtain a positive electrode active material powder and a negative electrode active material powder. It can be confirmed using an X-ray diffractometer and ICP-AES that a composition of the produced powder is the desired positive electrode active material $Li_{a2}V_{b2}Ti_{c2}Al_{d2}(PO_4)_3$ and negative electrode active material $Li_{a1}V_{b1}Ti_{c1}Al_{d1}(PO_4)_3$.

Also, the preparing method is not limited to the above solid-phase synthesis, and liquid-phase synthesis using a water-soluble salt such as a nitrate, acetate, and oxalate and a glass molten salt method can be utilized.

(Method for Producing all-Solid-State Battery)

The all-solid-state battery 1 in the embodiment can be produced through the following procedure. Respective materials used for each of the positive electrode collector layer 31, the positive electrode active material layer 32, the solid electrolyte layer 50, the negative electrode collector layer 41, the negative electrode active material layer 42, the outer layers 90, and the margin layer 80 are made into a paste. A method for making a paste is not particularly limited, and, for example, a paste can be obtained by mixing the powders of the above materials with a vehicle. Here, the vehicle is a general term for a medium in a liquid phase and includes a solvent, a binder, and the like. Although the binder contained in the paste configured to form a green sheet or a printing layer is not particularly limited, a polyvinyl acetal resin, a cellulose resin, an acrylic resin, a urethane resin, a vinyl acetate resin, a polyvinyl alcohol resin, and the like can be utilized, and at least one of these resins can be contained in a slurry.

Also, the paste may contain a plasticizer. Although a type of plasticizer is not particularly limited, phthalates such as dioctyl phthalate and diisononyl phthalate may be utilized.

Through such a method, a paste for a positive electrode collector layer, a paste for a positive electrode active material layer, a paste for a solid electrolyte layer, a paste for a negative electrode active material layer, a paste for a negative electrode collector layer, a paste for an outer layer, and a paste for a margin layer are prepared.

The prepared paste for a solid electrolyte layer described above is applied onto a base member such as polyethylene terephthalate (PET) or the like such that it has a desired thickness and is dried if necessary to prepare a green sheet for a solid electrolyte. A method for preparing a green sheet for a solid electrolyte is not particularly limited, and a known method such as a doctor blade method, a die coater, a comma coater, or a gravure coater can be adopted. Subsequently, the positive electrode active material layer 32, the positive electrode collector layer 31, and the positive electrode active material layer 32 are printed and laminated in this order on the green sheet for a solid electrolyte using screen printing to form a positive electrode layer. Furthermore, in order to fill a step between the green sheet for a solid electrolyte and the positive electrode layer, screen printing is performed on a region other than that of the positive electrode layer using the paste for a margin layer to form the margin layer 80, and a positive electrode layer unit is produced.

A negative electrode layer unit can also be produced through the same method as in the positive electrode layer unit, and a negative electrode layer unit is prepared by performing screen printing on a region on the green sheet for a solid electrolyte other than a negative electrode layer using the paste for a margin layer to form the margin layer 80.

Also, the positive electrode layer unit and the negative electrode layer unit can be alternately offset and laminated so that one ends thereof do not coincide with each other, and the outer layers 90 can be provided if necessary. A laminated substrate is prepared by laminating the outer layers 90. For each of the outer layers 90, the same materials as in the solid electrolyte layer 50 can be used, and the green sheet for a solid electrolyte can be used.

When a material different from that of the solid electrolyte layer 50 is used, a green sheet for an outer layer is prepared by applying the prepared paste for an outer layer described above on a base member such as polyethylene terephthalate (PET) to have a desired thickness and drying it if necessary. Furthermore, each of the outer layers 90 can be provided by performing laminating using the green sheet for an outer layer.

Although the production method is used for producing a parallel type all-solid-state battery, in a method for producing a series type all-solid-state battery, layers may be laminated so that one end of a positive electrode layer coincides with one end of a negative electrode layer, that is, offsetting is not performed.

Also, the prepared laminated substrates can be collectively pressed using a mold press, a hot water isotropic press (WIP), a cold water isotropic press (CIP), a hydrostatic press, or the like to improve the adhesion. It is preferable that pressurization be performed while heating and can be performed, for example, at 40 to 95° C.

The prepared laminated substrate can be cut into an unfired all-solid-state battery laminate body using a dicing device.

The laminate body 20 is produced by removing of a binder in the unfired laminate body of the all-solid-state battery and firing it. In the removing of a binder and the firing, the firing can be performed at a temperature of 600° C. 1100° C. in a nitrogen atmosphere. A holding time for the removing of a binder and the firing is, for example, 0.1 to 6 hours.

Also, the all-solid-state battery 1 can be prepared by providing the positive electrode external electrode 60 and the negative electrode external electrode 70 on the laminate body 20 to efficiently draw an electric current from the laminate body 20. The positive electrode external electrode 60 and the negative electrode external electrode 70 are connected to one end of the positive electrode collector layer 31 extending to one side surface of the laminate body 20 and one end of the negative electrode collector layer 41 extending to one side surface of the laminate body 20. Therefore, the pair of the positive electrode external electrode 60 and the negative electrode external electrode 70 are formed so that one side surface of the laminate body is arranged therebetween. Examples of the method for forming the positive electrode external electrode 60 and the negative electrode external electrode 70 include a sputtering method, a screen printing method, and a dip coating method. In the screen printing method and the dip coating method, a paste for an external electrode containing a metal powder, a resin, and a solvent is prepared, and this is formed as the positive electrode external electrode 60 and the negative electrode external electrode 70. Subsequently, a firing step for removing a solvent and a plating process for forming terminal electrodes on surfaces of the positive electrode external electrode 60 and the negative electrode external electrode 70 are performed. On the other hand, in a sputtering method, an external electrode and a terminal electrode can be directly formed. Thus, the firing step and the plating process are not required.

The all-solid-state battery 1 may be sealed in, for example, a coin cell to improve moisture resistance and impact resistance. The sealing method is not particularly limited, and, for example, a laminate body which has been subjected to firing may be sealed with a resin. Furthermore, an insulator paste having an insulator such as $Al_2O_3$ may be applied or dip-coated around the laminate body, and the insulating paste may be sealed through heat treatment.

In the all-solid-state battery 1 in the embodiment, the negative electrode active material layer 42 contains LVTP (negative) represented by the general Expression (I) described above. Thus, the electron conductivity of the negative electrode active material layer is improved, and a chemical reaction in the negative electrode active material layer is smoothly performed. Furthermore, when the thickness of the negative electrode active material layer 42 is set within the range of 2 μm or more and 100 μm or less, it is possible to effectively reduce the amount of the conductive auxiliary agent in the negative electrode active material, and it is possible to significantly increase a proportion of the active material which is responsible for the capacity of the all-solid-state battery 1 contained in the all-solid-state battery. For this reason, it is possible to improve the discharge capacity per unit volume of the all-solid-state battery 1. Furthermore, in the all-solid-state battery 1 in the embodiment, the relationship between the volume CV of the positive electrode active material contained in the positive electrode active material layer 32 and the volume AV of the negative electrode active material contained in the negative electrode active material layer 42 satisfy the foregoing Expression (1), the capacity balance between the positive electrode active material and the negative electrode active material is not easily lost, and the discharge capacity of per unit volume of the all-solid-state battery 1 does not easily decrease.

In the all-solid-state battery 1 in the embodiment, when the positive electrode active material layer 32 contains LVTP (positive) represented by the foregoing general Expression (II), it is possible to reduce the amount of excess active materials of the positive electrode active material layer and the negative electrode active material layer which are an excess volumes regardless of the discharge capacity. Thus, it is possible to further improve the discharge capacity per unit volume of the all-solid-state battery 1.

In the all-solid-state battery 1 in the embodiment, when the relationship between the weight CW of the positive electrode active material contained in the positive electrode active material layer 32 and the weight AW of the negative electrode active material contained in the negative electrode active material layer 42 satisfy the foregoing Expression (2), the volumes occupied by the excess active materials in the positive electrode active material layer 32 and the negative electrode active material layer 42 are reduced, and the discharge capacity per unit volume is improved.

In the all-solid-state battery 1 in the embodiment, when the solid electrolyte contains any one of titanium aluminum lithium phosphate, lithium zirconium phosphate, and garnet-type zirconate as a main component, since these substances have high electron resistance, the thickness of the solid electrolyte layer 50 can thus be reduced. Therefore, since the volume of the portion which does not contribute to the discharge capacity is reduced, the discharge capacity per unit volume of the all-solid-state battery 1 is improved.

In the all-solid-state battery 1 in the embodiment, when the area S1 of the portion of the negative electrode active material layer 42 in contact with the solid electrolyte layer 50 and the area S2 of the portion of the positive electrode active material layer 32 in contact with the solid electrolyte layer 50 satisfy the foregoing Expression (3), it is possible to smoothly perform an intercalation reaction of Li into the negative electrode active material at the time of performing charging. In addition, when the negative electrode active material is deployed in a direction of a lamination surface, the presence of the active material in the all-solid-state battery 1 extends to the exterior portion of the side surface, and the thickness of the negative electrode active material layer can be reduced. Thus, it is possible to improve the discharge capacity per unit volume of the all-solid-state battery 1.

Although the embodiments according to the present invention have been described in detail above, the present invention is not limited to the above embodiments and various modifications are possible.

For example, a first intermediate layer may be provided between the positive electrode active material layer 32 and the solid electrolyte layer 50, and a second intermediate layer may be provided between the negative electrode active material layer 42 and the solid electrolyte layer 50. It is preferable that the first intermediate layer and the second intermediate layer contain at least one element selected from the group consisting of Li, Al, Ti, V, Zr, and P.

EXAMPLES

Although the present invention will be described in more detail below using examples and comparative examples on the basis of the above embodiments, the present invention is not limited to these examples. The "parts" indication of an amount of material to be incorporated in the preparation of the paste means "parts by mass" unless otherwise stated.

Example 1

(Preparation of Positive Electrode Active Material)

As a positive electrode active material, $Li_3V_{1.5}Ti_{0.5}(PO_4)_3$ prepared through the following method was used. This corresponded to a2=3.0, b2=1.5, c2=0.5, and d2=0 in $Li_{a2}V_{b2}Ti_{c2}Al_{d2}(PO_4)_3$ of the foregoing general Expression (II). As a preparing method, wet mixing was performed using $Li_2CO_3$, $V_2O_5$, $TiO_2$, and $NH_4H_2PO_4$ as starting materials with a ball mill for 16 hours, and the powders obtained after water-removing and drying were calcined at 850° C. for 2 hours in a nitrogen-hydrogen mixed gas. The calcined product was wet-pulverized with a ball mill and then water-removed and dried to obtain a positive electrode active material powder. It was confirmed using an X-ray diffractometer that the composition of the produced powder was $Li_3V_{1.5}Ti_{0.5}(PO_4)_3$.

(Preparation of Negative Electrode Active Material)

As a negative electrode active material, $Li_3VTi(PO_4)_3$ prepared through the following method was used. This corresponded to a1=3.0, b1=1.0, c1=1.0, and d1=0 in $Li_{a1}V_{b1}Ti_{c1}Al_{d1}(PO_4)_3$ of the foregoing general Expression (I). As a producing method, wet mixing was performed using $Li_2CO_3$, $V_2O_5$, $TiO_2$, and $NH_4H_2PO_4$ as starting materials with a ball mill for 16 hours, and the powders obtained after water-removing and drying were calcined at 850° C. for 2 hours in a nitrogen-hydrogen mixed gas. The calcined product was wet-pulverized with a ball mill and then water-removed and dried to obtain a negative electrode active material powder. It was confirmed using an X-ray diffractometer that the composition of the produced powder was $Li_3VTi(PO_4)_3$.

(Preparation of Paste for Positive Electrode Active Material Layer)

For a paste for a positive electrode active material layer, a paste for a positive electrode active material layer and a paste for a negative electrode active material layer were prepared by adding 15 parts of ethyl cellulose as a binder and 65 parts of dihydroterpineol as a solvent to 100 parts of a powder made of $Li_3V_{1.5}Ti_{0.5}(PO_4)_3$ and mixing and dispersing the mixture.

(Preparation of paste for negative electrode active material layer)

For a paste for a negative electrode active material layer, a paste for a positive electrode active material layer and a paste for a negative electrode active material layer were prepared by adding 15 parts of ethyl cellulose as a binder and 65 parts of dihydroterpineol as a solvent to 100 parts of a powder made of $Li_3VTi(PO_4)_3$ and mixing and dispersing the mixture.

(Preparation of Paste for Solid Electrolyte Layer)

As a solid electrolyte, $Li_{1.3}Al_{0.3}Ti_{1.7}(PO_4)_3$ prepared through the following method was used. The producing method included performing wet mixing using $Li_2CO_3$, $Al_2O_3$, $TiO_2$, and $NH_4H_2PO_4$ as starting materials with a ball mill for 16 hours, performing water-removing and drying, and then calcining the obtained powder at 800° C. for 2 hours in the air. After calcinations, wet pulverization was performed with a ball mill for 16 hours, and then water-removing and drying was performed to obtain a solid electrolyte powder. It was confirmed using an X-ray diffractometer (XRD) that the composition of the produced power was $Li_{1.3}Al_{0.3}Ti_{1.7}(PO_4)_3$.

Subsequently, 100 parts of ethanol as a solvent and 200 parts of toluene were added to this powder, and wet mixing was performed with a ball mill. After that, 16 parts of a polyvinyl butyral-based binder and 4.8 parts of benzyl butyl phthalate were further added and mixed to prepare a paste for a solid electrolyte layer.

(Preparation of Sheet for Solid Electrolyte Layer)

A sheet was formed using a paste for a solid electrolyte layer and a PET film as a base member through a doctor blade method to obtain a sheet for a solid electrolyte layer with a thickness of 15 μm.

(Preparation of Paste for Positive Electrode Collector Layer)

As a paste for a positive electrode collector layer, Cu and $Li_3V_{1.5}Ti_{0.5}(PO_4)_3$ were mixed so that a volume ratio of 80/20 was obtained, and then 10 parts of ethyl cellulose as a binder and 50 parts of dihydroterpineol as a solvent were added to the mixture, and mixed and dispersed to prepare a paste for a positive electrode collector layer.

(Preparation of Paste for Negative Electrode Collector Layer)

As a paste for a negative electrode collector layer, Cu and $Li_3VTi(PO_4)_3$ were mixed so that a volume ratio of 80/20 was obtained, and then 10 parts of ethyl cellulose as a binder and 50 parts of dihydroterpineol as a solvent were added to the mixture, and mixed and dispersed to prepare a paste for a negative electrode collector layer.

(Preparation of Paste for Margin Layer)

For a paste for an outer layer, 100 parts of ethanol as a solvent and 100 parts of toluene were added to a powder of $Li_{1.3}Al_{0.3}Ti_{1.7}(PO_4)_3$, and wet-mixed with a ball mill, and then 16 parts of a polyvinyl butyral-based binder and 4.8 parts of benzyl butyl phthalate were further added to the mixture and mixed to prepare a paste for a margin layer.

(Preparation of Paste for External Electrode)

A thermosetting paste for an external electrode was prepared by mixing and dispersing a silver powder, an epoxy resin, and a solvent.

An all-solid-state battery was prepared as follows using these pastes.

(Preparation of Positive Electrode Layer Unit)

A positive electrode active material layer (referred to as a "first positive electrode active material layer") with a thickness of 2.5 μm was formed on the sheet for a solid electrolyte layer using screen printing so that a thickness of the positive electrode active material layer after firing was 2.0 μm and was dried at 80° C. for 10 minutes. Subsequently, a positive electrode collector layer with a thickness of 5 μm was formed on the positive electrode active material layer using screen printing and was dried at 80° C. for 10 minutes. A positive electrode active material layer (referred to as a "second positive electrode active material layer") with a thickness of 2.5 μm was further formed on the positive electrode collector layer using screen printing and was dried at 80° C. for 10 minutes to prepare a positive electrode layer on a sheet for a solid electrolyte layer. Subsequently, a paste for a margin layer was printed and formed on an outer circumference of one end of the positive electrode layer using screen printing to have a height of substantially the same level as that of the positive electrode layer and was dried at 80° C. for 10 minutes. Subsequently, when a PET film was released, a sheet for a positive electrode layer unit was obtained.

(Preparation of Negative Electrode Layer Unit)

A negative electrode active material layer (referred to as a "first negative electrode active material layer") with a thickness of 2.5 µm was formed on the sheet for a solid electrolyte layer using screen printing so that a thickness of the negative electrode active material layer after firing was 2.0 µm and was dried at 80° C. for 10 minutes. Subsequently, a negative electrode collector layer with a thickness of 5 µm was formed on the negative electrode active material layer using screen printing and was dried at 80° C. for 10 minutes. A negative electrode active material layer (referred to as a "second negative electrode active material layer") with a thickness of 2.5 µm was further formed on the negative electrode collector layer and was dried at 80° C. for 10 minutes to prepare a negative electrode layer on a sheet for a solid electrolyte layer. Subsequently, a paste for a margin layer was printed and formed on an outer circumference of one end of the negative electrode layer using screen printing to have a height of substantially the same level as the negative electrode layer and was dried at 80° C. for 10 minutes. Subsequently, when a PET film was released, a sheet for a negative electrode layer unit was obtained.

(Preparation of Laminate Body)

A plurality of positive electrode layer units and a plurality of negative electrode layer units were alternately laminated while being offset so that one of their ends thereof did not coincide with each other, and a laminated substrate was prepared so that 25 layers of positive electrodes and 25 layers of negative electrodes in an all-solid-state battery were provided. Furthermore, a plurality of solid electrolyte sheets were laminated as outer layers on both main surfaces of the laminated substrate, and an outer layer with 500 µm was provided. This underwent thermocompression through a die press and then was cut to prepare an unfired laminate body for an all-solid-state battery. Subsequently, the laminate body underwent binder removal and firing to obtain a laminate body for an all-solid-state battery. In the binder removal, a temperature was raised to a binder removing temperature of 700° C. at a heating rate of 60° C./hour in a reducing atmosphere, the temperature was maintained at that temperature for 5 hours, and the laminate body was taken out after natural cooling. In the firing, a temperature was raised to a firing temperature of 750° C. at a heating temperature of 200° C./hour in nitrogen, the temperature was maintained at that time for 2 hours, and the laminate body was taken out after natural cooling.

(External Electrode Forming Step)

A paste for an external electrode was applied to an end surface of the laminate body of the all-solid-state battery and underwent thermosetting at 150° C. for 30 minutes to form a pair of external electrodes. An all-solid-state battery according to Example 1 was prepared using the above members.

Examples 2 to 7

As all-solid-state batteries according to Examples 2 to 7, all-solid-state batteries were prepared in the same manner as in Example 1, except that printing and applying amounts of a positive electrode active material layer and a negative electrode active material layer using screen printing were adjusted when a positive electrode layer unit and a negative electrode layer unit were prepared so that thicknesses of the positive electrode active material layer and the negative electrode active material layer were 5.0 µm (Example 2), 10 µm (Example 3), 20 µm (Example 4), 50 µm (Example 5), 70 µm (Example 6), and 100 µm (Example 7).

Examples 8 to 10

In all-solid-state batteries according to Examples 8 to 10, when negative electrode active materials were prepared, the negative electrode active materials were prepared so that b1 and c1 were as shown in Table 1. Furthermore, all-solid-state batteries were prepared in the same manner as in Example 1, except that printing and applying amounts of a positive electrode active material layer and a negative electrode active material layer using screen printing were adjusted when a positive electrode layer unit and a negative electrode layer unit were prepared so that a thickness of the positive electrode active material layer and the negative electrode active material layer was 10 µm.

Comparative Example 1

As an all-solid-state battery according to Comparative Example 1, an all-solid-state battery was prepared in the same manner as in Example 1, except that printing and applying amounts of a positive electrode active material layer and a negative electrode active material layer using screen printing were adjusted when a positive electrode layer unit and a negative electrode layer unit were prepared so that a thickness of a positive electrode active material layer and a negative electrode active material layer was 1.0 µm.

Comparative Example 2

In an all-solid-state battery according to Comparative Example 2, a positive electrode active material and a negative electrode active material were prepared so that b2, c2, b1, and c1 were as shown in Table 1 when the positive electrode active material and the negative electrode active material were prepared. Furthermore, an all-solid-state battery was prepared in the same manner as in Example 1, except that printing and applying amounts of a positive electrode active material layer and a negative electrode active material layer using screen printing were adjusted when a positive electrode layer unit and a negative electrode layer unit were prepared so that a thickness of the positive electrode active material layer and the negative electrode active material layer was 10 µm.

Comparative Examples 3 to 6

All-solid-state batteries according to Comparative Examples 3 to 6 were prepared as a positive electrode active material and a negative electrode active material so that b2, c2, b1, and c1 were as shown in Table when a positive electrode active material and a negative electrode active material were prepared. Furthermore, all-solid-state batteries were prepared in the same manner as in Example 1, except that printing and applying amounts of a positive electrode active material layer and a negative electrode active material layer using screen printing were adjusted so that thicknesses of the positive electrode active material layer and the negative electrode active material layer were 1.0 μm (Comparative Example 3), 2.0 μm (Comparative Example 4), 5.0 μm (Comparative Example 5), and 10 μm (Comparative Example 6) when a positive electrode layer unit and a negative electrode layer unit were prepared.

(Battery Evaluation)

The all-solid-state batteries produced in this example and comparative examples can be evaluated for the following battery characteristics.

[AV, CV, AW, CW, and R]

A volume AV of a negative electrode active material and a volume CV of a positive electrode active material were measured as follows. An all-solid-state battery was disassembled, and the number of layers AN of a negative electrode active material layer and the number of layers CN of a positive electrode active material layer were measured. Subsequently, an area S1 of a portion of the negative electrode active material layer in contact with a solid electrolyte layer and an area S2 of the positive electrode active material layer in contact with the solid electrolyte layer were measured using the foregoing method. Subsequently, a thickness t1 of the negative electrode active material layer and a thickness t2 of a positive electrode active material layer 32 were measured using the foregoing method. Subsequently, a ratio R1 occupied by the negative electrode active material of the negative electrode active material layer and a ratio R2 occupied by the positive electrode active material of the positive electrode active material layer were calculated using the foregoing method. Moreover, the volume AV was calculated from the expression: AV=S1×t1×R1×AN, and the volume CV was calculated from the expression: CV=S2×t2×R2×CN.

A weight AW of the negative electrode active material was calculated by multiplying the volume AV obtained as described above by a density of the negative electrode active material. A weight CW of the positive electrode active material was calculated by multiplying the volume CV obtained as described above by a density of the positive electrode active material.

R was calculated using the expression:
$$CW/\{((b1+c1)/(b1+c1+d1))\times((b2+c2+d2)/b2)\times AW\}.$$

[Discharge Capacity Per Unit Volume]

Discharge capacities of the all-solid-state batteries prepared in this example and the comparative examples can be evaluated, for example, under the following charge/discharge conditions. Under the charging/discharging conditions, constant voltage charging (CV charging) was performed for 5 hours so that a battery voltage is 1.6 V at a maximum current of 500 μA in an environment of 70° C., and then the battery was discharged at a constant current of 20 μA (CC discharging) until a battery voltage reached 0 V. A capacity at the time of CC discharging under the above conditions was defined as a discharge capacity, and a value divided by the volume of the prepared all-solid-state battery was defined as a discharge capacity per unit volume. The unit was mAh/L.

(Result 1)

Table 1 shows the compositions (a2, b2, c2, and d2), the volumes CV, and the weights CW of the positive electrode active materials, the compositions (a1, b1, c1, and d1), the volumes AV, the weights AW, and the thicknesses (t1) of the negative electrode active materials, the CV/AVs, the Rs, and the results of the discharge capacity per unit volume of the all-solid-state batteries according to Examples 1 to 10 and Comparative Examples 1 to 6.

In the all-solid-state batteries according to Examples 1 to 7, it was confirmed that the discharge capacity per unit volume was superior to those of the all-solid-state batteries according to Comparative Examples 3 to 6.

Also, in the all-solid-state batteries according to Example 3 and Examples 8 to 10, it was confirmed that the discharge capacity per unit volume was superior to those of the all-solid-state batteries according to Comparative Example 2 and Comparative Example 6.

Furthermore, in the all-solid-state batteries according to Examples 1 to 7, it was confirmed that the discharge capacity per unit volume was superior to that of the all-solid-state battery according to Comparative Example 1.

TABLE 1

| | Positive electrode active material layer | | | | | | Negative electrode active material layer | | | | | | | | | DISCHARGE CAPACITY PER UNIT VOLUME [Ah/L] |
|---|---|---|---|---|---|---|---|---|---|---|---|---|---|---|---|---|
| | a2 | b2 | c2 | d2 | CV [mm³] | CW [mg] | a1 | b1 | c1 | d1 | AV [mm³] | AW [mg] | Thickness [μm] | CV/AV | R | |
| Example 1 | 3.0 | 1.5 | 0.5 | 0 | 0.7 | 2.1 | 3.0 | 1.0 | 1.0 | 0 | 0.7 | 2.1 | 2.0 | 1 | 0.75 | 14 |
| Example 2 | 3.0 | 1.5 | 0.5 | 0 | 1.7 | 5.3 | 3.0 | 1.0 | 1.0 | 0 | 1.7 | 5.3 | 5.0 | 1 | 0.75 | 26 |
| Example 3 | 3.0 | 1.5 | 0.5 | 0 | 3.4 | 10.5 | 3.0 | 1.0 | 1.0 | 0 | 3.4 | 10.5 | 10 | 1 | 0.75 | 38 |
| Example 4 | 3.0 | 1.5 | 0.5 | 0 | 6.9 | 21.3 | 3.0 | 1.0 | 1.0 | 0 | 6.9 | 21.3 | 20 | 1 | 0.75 | 36 |
| Example 5 | 3.0 | 1.5 | 0.5 | 0 | 17.2 | 53.3 | 3.0 | 1.0 | 1.0 | 0 | 17.2 | 53.3 | 50 | 1 | 0.75 | 21 |
| Example 6 | 3.0 | 1.5 | 0.5 | 0 | 24.1 | 74.7 | 3.0 | 1.0 | 1.0 | 0 | 24.1 | 74.7 | 70 | 1 | 0.75 | 15 |
| Example 7 | 3.0 | 1.5 | 0.5 | 0 | 33.9 | 105 | 3.0 | 1.0 | 1.0 | 0 | 33.9 | 105 | 100 | 1 | 0.75 | 9 |
| Example 8 | 3.0 | 1.5 | 0.5 | 0 | 3.4 | 10.5 | 3.0 | 1.8 | 0.2 | 0 | 3.4 | 10.5 | 10 | 1 | 0.75 | 26 |
| Example 9 | 3.0 | 1.5 | 0.5 | 0 | 3.4 | 10.5 | 3.0 | 1.5 | 0.5 | 0 | 3.4 | 10.5 | 10 | 1 | 0.75 | 31 |
| Example 10 | 3.0 | 1.5 | 0.5 | 0 | 3.4 | 10.5 | 3.0 | 0.6 | 1.4 | 0 | 3.4 | 10.5 | 10 | 1 | 0.75 | 13 |
| Comparative Example 1 | 3.0 | 1.0 | 1.0 | 0 | 0.3 | 1.1 | 3.0 | 1.0 | 1.0 | 0 | 0.3 | 1.1 | 1.0 | 1 | 0.50 | 8 |
| Comparative Example 2 | 3.0 | 0.4 | 1.6 | 0 | 3.4 | 10.5 | 3.0 | 0.4 | 1.6 | 0 | 3.4 | 10.5 | 10 | 1 | 0.20 | 6 |
| Comparative Example 3 | 3.0 | 2.0 | 0 | 0 | 0.3 | 1.1 | 3.0 | 2.0 | 0 | 0 | 0.3 | 1.1 | 1.0 | 1 | 1.00 | 4 |
| Comparative Example 4 | 3.0 | 2.0 | 0 | 0 | 0.7 | 2.1 | 3.0 | 2.0 | 0 | 0 | 0.7 | 2.1 | 2.0 | 1 | 1.00 | 5 |
| Comparative Example 5 | 3.0 | 2.0 | 0 | 0 | 1.7 | 5.3 | 3.0 | 2.0 | 0 | 0 | 1.7 | 5.3 | 5.0 | 1 | 1.00 | 2 |
| Comparative Example 6 | 3.0 | 2.0 | 0 | 0 | 3.4 | 10.5 | 3.0 | 2.0 | 0 | 0 | 3.4 | 10.5 | 10 | 1 | 1.00 | 0 |

Examples 11 to 18

In all-solid-state batteries according to Examples 11 to 18, when positive electrode active materials and negative electrode active materials were prepared, positive electrode active materials and negative electrode active materials were prepared so that b2, c2, d2, b1, c1, and d1 were as shown in Table 2. Furthermore, all-solid-state batteries were prepared in the same manner as in Example 1, except that printing and applying amounts of a positive electrode active material layer and a negative electrode active material layer using screen printing were adjusted so that a thickness of the positive electrode active material layer and the negative electrode active material layer was 10 μm when a positive electrode layer unit and a negative electrode layer unit were prepared. In addition, the obtained all-solid-state batteries were evaluated.

Comparative Example 7

In an all-solid-state battery according to Comparative Example 7, when a positive electrode active material and a negative electrode active material were prepared, the positive electrode active material and the negative electrode active material were prepared so that b2, c2, d2, b1, c1, and d1 were as shown in Table 2. Furthermore, an all-solid-state battery was prepared in the same manner as in Example 1, except that printing and applying amounts of a positive electrode active material layer and a negative electrode active material layer using screen printing were adjusted so that a thickness of the positive electrode active material layer and the negative electrode active material layer was 10 μm when a positive electrode layer unit and a negative electrode layer unit were prepared. In addition, the obtained all-solid-state battery was evaluated.

(Result 2)

Table 2 shows the compositions, the volumes CV, and the weights CW of the positive electrode active materials, the compositions, the volumes AV, the weights AW, and the thicknesses of the negative electrode active materials, CV/AVs, Rs, and the results of the discharge capacity per unit volume of the all-solid-state batteries according to Examples 11 to 18 and Comparative Example 7.

In the all-solid-state batteries according to Examples 11 to 18, it was confirmed that the discharge capacity per unit volume was superior to that of the all-solid-state battery according to Comparative Example 7.

Examples 19 to 24

In all-solid-state batteries according to Examples 19 to 24, an amount of a paste for the positive electrode active material layer to be applied required for screen printing was calculated by multiplying a target amount of positive electrode active material by a value obtained by dividing the total area of the positive electrode active material layer included in one all-solid-state battery by a printing area to be applied through screen printing, and dividing the result value by a proportion of the positive electrode active material in the paste for a positive electrode active material layer so that a weight CW of a positive electrode active material contained in a positive electrode active material layer per one all-solid-state battery was the value shown in Table 3 when a positive electrode layer unit and a negative electrode layer unit were prepared. In order to obtain this value, the amount of the paste for a positive electrode active material layer to be applied in the printing of the positive electrode active material layer in screen printing was adjusted by changing a mesh type of a screen and the number of times of printing. Similarly, an amount of the paste for a negative electrode active material layer to be applied required for screen printing was calculated by multiplying a target amount of negative electrode active material by a value obtained by dividing the total area of the negative electrode active material layer included in one all-solid-state battery by a printing area to be applied through screen printing, and diving the result value by a proportion of the negative electrode active material in the paste for a negative electrode active material layer so that a weight AW of a negative electrode active material included in the negative electrode active material layer was 7.0 mg. In order to obtain this value, the amount of the paste for a negative electrode active material layer to be applied in the printing of the negative electrode active material layer in the screen printing was adjusted by changing a mesh type of a screen and the number of times of printing. Other than that, all-solid-state batteries were prepared in the same manner as in Example 1, and the obtained all-solid-state batteries were evaluated.

Examples 25 to 30

In all-solid-state batteries according to Examples 25 to 30, when a positive electrode active material and a negative electrode active material were prepared, $Li_3V_{1.5}Ti_{0.5}(PO_4)_3$ was prepared as a positive electrode active material, $Li_3VTi$

TABLE 2

| | Positive electrode active material layer | | | | | | Negative electrode active material layer | | | | | | | | DISCHARGE CAPACITY PER UNIT VOLUME [Ah/L] |
|---|---|---|---|---|---|---|---|---|---|---|---|---|---|---|---|
| | a2 | b2 | c2 | d2 | CV [mm³] | CW [mg] | a1 | b1 | c1 | d1 | AV [mm³] | AW [mg] | Thickness [μm] | CV/AV | R | |
| Example 11 | 3.0 | 2.0 | 0.0 | 0 | 3.4 | 10.5 | 3.0 | 1.0 | 1.0 | 0 | 3.4 | 10.5 | 10 | 1 | 1.00 | 38 |
| Example 12 | 3.0 | 1.9 | 0.0 | 0.1 | 3.4 | 10.5 | 3.0 | 1.0 | 0.9 | 0.1 | 3.4 | 10.5 | 10 | 1 | 1.00 | 32 |
| Example 13 | 3.0 | 1.8 | 0.0 | 0.2 | 3.4 | 10.5 | 3.0 | 1.0 | 0.8 | 0.2 | 3.4 | 10.5 | 10 | 1 | 1.00 | 29 |
| Example 14 | 3.0 | 1.7 | 0.0 | 0.3 | 3.4 | 10.5 | 3.0 | 1.0 | 0.7 | 0.3 | 3.4 | 10.5 | 10 | 1 | 1.00 | 25 |
| Example 15 | 3.0 | 1.6 | 0.0 | 0.4 | 3.4 | 10.5 | 3.0 | 1.0 | 0.6 | 0.4 | 3.4 | 10.5 | 10 | 1 | 1.00 | 21 |
| Example 16 | 3.0 | 1.6 | 0.0 | 0.4 | 3.4 | 10.5 | 3.0 | 1.0 | 0.5 | 0.5 | 3.4 | 10.5 | 10 | 1 | 1.07 | 18 |
| Example 17 | 3.0 | 1.6 | 0.0 | 0.4 | 3.4 | 10.5 | 3.0 | 1.0 | 0.4 | 0.6 | 3.4 | 10.5 | 10 | 1 | 1.14 | 14 |
| Example 18 | 3.0 | 1.6 | 0.0 | 0.4 | 3.4 | 10.5 | 3.0 | 1.0 | 0.3 | 0.7 | 3.4 | 10.5 | 10 | 1 | 1.23 | 10 |
| Comparative Example 7 | 3.0 | 1.6 | 0.0 | 0.4 | 3.4 | 10.5 | 3.0 | 1.0 | 0.2 | 0.8 | 3.4 | 10.5 | 10 | 1 | 1.33 | 6 |

$(PO_4)_3$ was prepared as a negative electrode active material, and these were used for a positive electrode active material layer and a negative electrode active material layer. Furthermore, when a positive electrode layer unit and a negative electrode layer unit were prepared, an amount of the paste for a positive electrode active material layer to be applied required for screen printing, was calculated by multiplying a target amount of positive electrode active material by a value obtained by dividing the total area of a positive electrode active material layer included in one all-solid-state battery by a printing area to be applied through screen printing, and dividing the result value by a proportion of the positive electrode active material in the paste for a positive electrode active material layer so that a weight CW of a positive electrode active material contained in a positive electrode active material layer per one all-solid-state battery was the value shown in Table 3. In order to obtain this value, the amount of the paste for a positive electrode active material layer to be applied in the printing of the positive electrode active material layer in screen printing was adjusted by changing a mesh type of a screen and the number of times of printing. Similarly, an amount of the paste for a negative electrode active material layer to be applied required for screen printing was calculated by multiplying a target amount of negative electrode active material by a value obtained by dividing the total area of the negative electrode active material layer included in one all-solid-state battery by a printing area to be applied through screen printing, and dividing the result value by a proportion of the negative electrode active material in the paste for a negative electrode active material layer so that a weight AW of the negative electrode active material contained in the negative electrode active material layer was 10 mg. In order to obtain this value, the amount of the paste for a negative electrode active material layer to be applied in the printing of the negative electrode active material layer in the screen printing was adjusted by changing a mesh type of a screen and the number of times of printing. Other than that, all-solid-state batteries were prepared in the same manner as in Example 1, and the obtained all-solid-state batteries were evaluated.

(Result 3)

Table 3 shows the compositions, the volumes CV, and the weights CW of the positive electrode active materials, the compositions, the volumes AV, the weights AW, and the thicknesses of the negative electrode active materials, CV/AVs, Rs, and the results of the discharge capacity per unit volume of the all-solid-state batteries according to Examples 19 to 30 and the all-solid-state batteries according to Examples 11 to 18 and Comparative Example 7.

It can be seen that the all-solid-state batteries according to Examples 19 to 30 have a larger discharge capacity per unit volume and are better.

TABLE 3

|  | Positive electrode active material layer | | | | | | Negative electrode active material layer | | | | | | | | | DISCHARGE CAPACITY PER UNIT VOLUME [Ah/L] |
| --- | --- | --- | --- | --- | --- | --- | --- | --- | --- | --- | --- | --- | --- | --- | --- | --- |
|  | a2 | b2 | c2 | d2 | CV [mm³] | CW [mg] | a1 | b1 | c1 | d1 | AV [mm³] | AW [mg] | Thickness [µm] | CV/AV | R |  |
| Example 19 | 3.0 | 1.0 | 1.0 | 0 | 6.8 | 21.0 | 3.0 | 1.0 | 1.0 | 0 | 2.3 | 7.0 | 6.5 | 3.0 | 1.50 | 18 |
| Example 20 | 3.0 | 1.0 | 1.0 | 0 | 5.6 | 17.5 | 3.0 | 1.0 | 1.0 | 0 | 2.3 | 7.0 | 6.5 | 2.5 | 1.25 | 20 |
| Example 21 | 3.0 | 1.0 | 1.0 | 0 | 4.5 | 14.0 | 3.0 | 1.0 | 1.0 | 0 | 2.3 | 7.0 | 6.5 | 2.0 | 1.00 | 24 |
| Example 22 | 3.0 | 1.0 | 1.0 | 0 | 3.9 | 12.0 | 3.0 | 1.0 | 1.0 | 0 | 2.3 | 7.0 | 6.5 | 1.7 | 0.86 | 22 |
| Example 23 | 3.0 | 1.0 | 1.0 | 0 | 3.4 | 10.5 | 3.0 | 1.0 | 1.0 | 0 | 2.3 | 7.0 | 6.5 | 1.5 | 0.75 | 20 |
| Example 24 | 3.0 | 1.0 | 1.0 | 0 | 2.3 | 7.0 | 3.0 | 1.0 | 1.0 | 0 | 2.3 | 7.0 | 6.5 | 1.0 | 0.50 | 14 |
| Example 25 | 3.0 | 1.5 | 0.5 | 0 | 6.8 | 21.0 | 3.0 | 1.0 | 1.0 | 0 | 3.4 | 10.5 | 10 | 2.0 | 1.50 | 24 |
| Example 26 | 3.0 | 1.5 | 0.5 | 0 | 5.6 | 17.5 | 3.0 | 1.0 | 1.0 | 0 | 3.4 | 10.5 | 10 | 1.7 | 1.25 | 28 |
| Example 27 | 3.0 | 1.5 | 0.5 | 0 | 4.5 | 14.0 | 3.0 | 1.0 | 1.0 | 0 | 3.4 | 10.5 | 10 | 1.3 | 1.00 | 33 |
| Example 28 | 3.0 | 1.5 | 0.5 | 0 | 3.9 | 12.0 | 3.0 | 1.0 | 1.0 | 0 | 3.4 | 10.5 | 10 | 1.1 | 0.86 | 30 |
| Example 29 | 3.0 | 1.5 | 0.5 | 0 | 3.4 | 10.5 | 3.0 | 1.0 | 1.0 | 0 | 3.4 | 10.5 | 10 | 1.0 | 0.75 | 27 |
| Example 30 | 3.0 | 1.5 | 0.5 | 0 | 2.3 | 7.0 | 3.0 | 1.0 | 1.0 | 0 | 3.4 | 10.5 | 10 | 0.7 | 0.50 | 20 |

Examples 31 to 36

As all-solid-state batteries according to Examples 31 to 36, $Li_{1.5}Al_{0.5}Ge_{1.5}(PO_4)_3$ prepared through the following method was used as a solid electrolyte. The preparing method includes performing wet-mixing using $Li_2CO_3$, $Al_2O_3$, $GeO_2$, and $NH_4H_2PO_4$ as starting materials in a ball mill for 16 hours, removing water and drying, and then calcining the obtained powder at 750° C. for 2 hours in the air. After calcinations, wet pulverization was performed in a ball mill for 16 hours, and then water-removing and drying were performed to obtain a powder of a solid electrolyte. It was confirmed using an X-ray diffractometer (XRD) that the composition of the prepared power was $Li_{1.5}Al_{0.5}Ge_{1.5}(PO_4)_3$.

Also, all-solid-state batteries were prepared in the same manner as in Example 1, except that a positive electrode active material layer and a negative electrode active material layer were as shown in Table 4 when a positive electrode layer unit and a negative electrode layer unit were prepared, and the obtained all-solid-state batteries were evaluated.

(Result 4)

Table 4 shows the compositions, the volumes CV, and the weights CW of the positive electrode active materials, the compositions, the volumes AV, the weights AW, and the thicknesses of the negative electrode active materials, the CV/AVs, the Rs, and the results of the discharge capacity per unit volume of the all-solid-state batteries according to Examples 31 to 36.

It can be seen that the all-solid-state batteries according to Examples 31 to 36 have a larger discharge capacity per unit volume and are better.

TABLE 4

| | Positive electrode active material layer | | | | | | Negative electrode active material layer | | | | | | | | | DISCHARGE CAPACITY PER UNIT VOLUME [Ah/L] |
|---|---|---|---|---|---|---|---|---|---|---|---|---|---|---|---|---|
| | a2 | b2 | c2 | d2 | CV [mm³] | CW [mg] | a1 | b1 | c1 | d1 | AV [mm³] | AW [mg] | Thickness [μm] | CV/AV | R | |
| Example 31 | 3.0 | 1.0 | 1.0 | 0 | 6.8 | 21.0 | 3.0 | 1.0 | 1.0 | 0 | 2.3 | 7.0 | 6.5 | 3.0 | 1.50 | 18 |
| Example 32 | 3.0 | 1.0 | 1.0 | 0 | 5.6 | 17.5 | 3.0 | 1.0 | 1.0 | 0 | 2.3 | 7.0 | 6.5 | 2.5 | 1.25 | 21 |
| Example 33 | 3.0 | 1.0 | 1.0 | 0 | 4.5 | 14.0 | 3.0 | 1.0 | 1.0 | 0 | 2.3 | 7.0 | 6.5 | 2.0 | 1.00 | 25 |
| Example 34 | 3.0 | 1.0 | 1.0 | 0 | 3.9 | 12.0 | 3.0 | 1.0 | 1.0 | 0 | 2.3 | 7.0 | 6.5 | 1.7 | 0.86 | 22 |
| Example 35 | 3.0 | 1.0 | 1.0 | 0 | 3.4 | 10.5 | 3.0 | 1.0 | 1.0 | 0 | 2.3 | 7.0 | 6.5 | 1.5 | 0.75 | 20 |
| Example 36 | 3.0 | 1.0 | 1.0 | 0 | 2.3 | 7.0 | 3.0 | 1.0 | 1.0 | 0 | 2.3 | 7.0 | 6.5 | 1.0 | 0.50 | 16 |

Examples 37 to 42

In laminated all-solid-state batteries according to Examples 37 to 42, $Li_{6.1}Al_{0.3}La_3Zr_2O_{12}$ prepared through the following method was used as a solid electrolyte. The preparing method includes performing wet-mixing using $Li_2CO_3$, $Al_2O_3$, $La(OH)_3$, and $ZrO_2$ as starting materials for 16 hours in a ball mill, removing water and drying, and then calcining the obtained powder at 1000° C. for 2 hours in the air. After calcinations, wet pulverization was performed in a ball mill for 16 hours, and then water-removing and drying were performed to obtain a powder of a solid electrolyte. It was confirmed using an X-ray diffractometer (XRD) that the composition of the prepared powder was $Li_{6.1}Al_{0.3}La_3Zr_2O_{12}$.

Also, the laminated all-solid-state batteries were prepared in the same manner as in Example 1, except that a positive electrode active material layer and a negative electrode active material layer were set as shown in Table 5 when a positive electrode layer unit and a negative electrode layer unit were prepared and a firing temperature was 1000° C. when a laminate body was prepared, and the obtained all-solid-state batteries were evaluated.

(Result 5)

Table 5 shows the compositions, the volumes CV, and the weights CW of the positive electrode active materials, the compositions, the volumes AV, the weights AW, and the thicknesses of the negative electrode active materials, the CV/AVs, the Rs, and the results of the discharge capacity per unit volume of the all-solid-state batteries according to Examples 37 to 42.

It can be seen that the laminated all-solid-state batteries according to Examples 37 to 42 have a larger discharge capacity per unit volume and are better.

Examples 43 to 48

In all-solid-state batteries according to Examples 43 to 48, $Li_{1.15}Y_{0.15}Zr_{1.85}(PO_4)_3$ prepared through the following method was used as a solid electrolyte. The preparing method includes dissolving $LiNO_3$, $Y(NO_3)_3$, $ZrO(NO_3)_2 \cdot 6H_2O$, and $NH_4H_2PO_4$ in water using $LiNO_3$, $Y(NO_3)_3$, $ZrO(NO_3)_2 \cdot 6H_2O$, and $NH_4H_2PO_4$ as starting materials, adjusting an aqueous solution, removing water, performing drying, and then calcining the obtained powder at 1000° C. for 2 hours in the air. After calcinations, wet pulverization was performed in a ball mill for 16 hours, and then the mixture was dried to obtain a powder of a solid electrolyte. It was confirmed using an X-ray diffractometer (XRD) that the composition of the prepared powder was $Li_{1.15}Y_{0.15}Zr_{1.85}(PO_4)_3$.

Also, all-solid-state batteries were prepared in the same manner as in Example 1, except that a positive electrode active material layer and a negative electrode active material layer were set as shown in Table 6 when a positive electrode layer unit and a negative electrode layer unit were prepared and a firing temperature was 1000° C. when a laminate body was prepared, and the obtained all-solid-state batteries were evaluated.

(Result 6)

Table 6 shows the compositions, the volumes CV, and the weights CW of the positive electrode active materials, the compositions, the volumes AV, the weights AW, and the thicknesses of the negative electrode active materials, the CV/AVs, the Rs, and the results of the discharge capacity per unit volume of the all-solid-state batteries according to Examples 43 to 48.

It can be seen that the all-solid-state batteries according to Examples 43 to 48 have a larger discharge capacity per unit volume and are better.

TABLE 5

| | Positive electrode active material layer | | | | | | Negative electrode active material layer | | | | | | | | | DISCHARGE CAPACITY PER UNIT VOLUME [Ah/L] |
|---|---|---|---|---|---|---|---|---|---|---|---|---|---|---|---|---|
| | a2 | b2 | c2 | d2 | CV [mm³] | CW [mg] | a1 | b1 | c1 | d1 | AV [mm³] | AW [mg] | Thickness [μm] | CV/AV | R | |
| Example 37 | 3.0 | 1.0 | 1.0 | 0 | 6.8 | 21.0 | 3.0 | 1.0 | 1.0 | 0 | 2.3 | 7.0 | 6.5 | 3.0 | 1.50 | 19 |
| Example 38 | 3.0 | 1.0 | 1.0 | 0 | 5.6 | 17.5 | 3.0 | 1.0 | 1.0 | 0 | 2.3 | 7.0 | 6.5 | 2.5 | 1.25 | 20 |
| Example 39 | 3.0 | 1.0 | 1.0 | 0 | 4.5 | 14.0 | 3.0 | 1.0 | 1.0 | 0 | 2.3 | 7.0 | 6.5 | 2.0 | 1.00 | 26 |
| Example 40 | 3.0 | 1.0 | 1.0 | 0 | 3.9 | 12.0 | 3.0 | 1.0 | 1.0 | 0 | 2.3 | 7.0 | 6.5 | 1.7 | 0.86 | 22 |
| Example 41 | 3.0 | 1.0 | 1.0 | 0 | 3.4 | 10.5 | 3.0 | 1.0 | 1.0 | 0 | 2.3 | 7.0 | 6.5 | 1.5 | 0.75 | 21 |
| Example 42 | 3.0 | 1.0 | 1.0 | 0 | 2.3 | 7.0 | 3.0 | 1.0 | 1.0 | 0 | 2.3 | 7.0 | 6.5 | 1.0 | 0.50 | 15 |

TABLE 6

| | Positive electrode active material layer | | | | | | Negative electrode active material layer | | | | | | | | | DISCHARGE CAPACITY PER UNIT VOLUME [Ah/L] |
|---|---|---|---|---|---|---|---|---|---|---|---|---|---|---|---|---|
| | a2 | b2 | c2 | d2 | CV [mm³] | CW [mg] | a1 | b1 | c1 | d1 | AV [mm³] | AW [mg] | Thickness [μm] | CV/AV | R | |
| Example 43 | 3.0 | 1.0 | 1.0 | 0 | 6.8 | 21.0 | 3.0 | 1.0 | 1.0 | 0 | 2.3 | 7.0 | 6.5 | 3.0 | 1.50 | 18 |
| Example 44 | 3.0 | 1.0 | 1.0 | 0 | 5.6 | 17.5 | 3.0 | 1.0 | 1.0 | 0 | 2.3 | 7.0 | 6.5 | 2.5 | 1.25 | 21 |
| Example 45 | 3.0 | 1.0 | 1.0 | 0 | 4.5 | 14.0 | 3.0 | 1.0 | 1.0 | 0 | 2.3 | 7.0 | 6.5 | 2.0 | 1.00 | 26 |
| Example 46 | 3.0 | 1.0 | 1.0 | 0 | 3.9 | 12.0 | 3.0 | 1.0 | 1.0 | 0 | 2.3 | 7.0 | 6.5 | 1.7 | 0.86 | 22 |
| Example 47 | 3.0 | 1.0 | 1.0 | 0 | 3.4 | 10.5 | 3.0 | 1.0 | 1.0 | 0 | 2.3 | 7.0 | 6.5 | 1.5 | 0.75 | 20 |
| Example 48 | 3.0 | 1.0 | 1.0 | 0 | 2.3 | 7.0 | 3.0 | 1.0 | 1.0 | 0 | 2.3 | 7.0 | 6.5 | 1.0 | 0.50 | 15 |

As shown in Results 1 to 6, when various numerical values relating to the positive electrode active material layers and the negative electrode active material layers are set within the range described in the present invention, it can be seen that the discharge capacity per unit volume is larger and a better all-solid-state battery can be prepared. Furthermore, it can be seen that various materials such as $Li_{1.3}Al_{0.3}Ti_{1.7}(PO_4)_3$, $Li_{1.5}Al_{0.5}Ge_{1.5}(PO_4)_3$, $Li_{6.1}Al_{0.3}La_3Zr_2O_{12}$, and $Li_{1.15}Y_{0.15}Zr_{1.85}(PO_4)_3$ can be selected as the main components of the solid electrolyte layer.

While the present invention has been described in detail above, the above-described embodiments and examples are merely examples, and the inventions disclosed herein include various modifications and alterations of the above-described specific examples.

REFERENCE SIGNS LIST

1 All-solid-state battery
20 Laminate body
30 Positive electrode
31 Positive electrode collector layer
32 Positive electrode active material layer
40 Negative electrode
41 Negative electrode collector layer
42 Negative electrode active material layer
50 Solid electrolyte layer
60 Positive electrode external electrode
70 Negative electrode external electrode
80 Margin layer
90 Outer layer

What is claimed is:

1. An all-solid-state battery, comprising:
a positive electrode collector layer;
a positive electrode active material layer;
a solid electrolyte layer;
a negative electrode active material layer; and
a negative electrode collector layer, and
wherein the positive electrode active material layer contains a positive electrode active material, the negative electrode active material layer contains a negative electrode active material, and
the negative electrode active material contains, as a main component, a compound represented by the following general Expression (I):

$$Li_{a1}V_{b1}Ti_{c1}Al_{d1}(PO_4)_3 \tag{I}$$

(where, in Expression (I), a1, b1, c1, and d1 indicate numbers in which they satisfy $2.8 \leq a1 < 5$, $0.6 \leq b1 \leq 2$, $0.1 \leq c1 \leq 1.4$, $0.1 \leq d1 \leq 0.7$, and $1.9 \leq b1+c1+d1 \leq 2.1$);

a relationship between a volume CV of the positive electrode active material contained in the positive electrode active material layer and a volume AV of the negative electrode active material contained in the negative electrode active material layer satisfies the following Expression (1):

$$0.7 \leq CV/AV \leq 3 \tag{1}$$

and a thickness of the negative electrode active material layer falls within a range of 2 μm or more and 100 μm or less.

2. The all-solid-state battery according to claim 1, wherein the positive electrode active material contains, as a main component, a compound represented by the following general Expression (II):

$$Li_{a2}V_{b2}Ti_{c2}Al_{d2}(PO_4)_3 \tag{II}$$

(where, in Expression (II), a2, b2, c2, and d2 indicate numbers in which $1 < a2 \leq 3.2$, $1 \leq b2 \leq 2$, $0.1 \leq c2 \leq 1$, $0.1 \leq d2 \leq 0.4$, and $1.9 \leq b2+c2+d2 \leq 2.1$ are satisfied).

3. The all-solid-state battery according to claim 2, wherein a relationship between a weight CW of the positive electrode active material contained in the positive electrode active material layer and a weight AW of the negative electrode active material contained in the negative electrode active material layer satisfies the following Expression (2):

$$0.75 \leq R \leq 1.25 \tag{2}$$

$$R = CW/\{((b1+c1)/(b1+c1+d1)) \times ((b2+c2+d2)/b2) \times AW\}$$

(where b1, c1, and d1 indicate the same numbers as b1, c1, and d1 in the foregoing general Expression (I) and b2, c2, and d2 indicate the same numbers as b2, c2, and d2 in the foregoing general Expression (II)).

4. The all-solid-state battery according to claim 3, wherein the solid electrolyte layer contains a solid electrolyte, and
the solid electrolyte contains, as a main component, any one of titanium aluminum lithium phosphate, lithium zirconium phosphate, and garnet-type zirconate.

5. The all-solid-state battery according to claim 3, wherein a relationship between an area S1 of a portion of the negative electrode active material layer in contact with the solid electrolyte layer and an area S2 of a portion of the positive electrode active material layer in contact with the solid electrolyte layer satisfies the following Expression (3):

$$S1/S2 > 1 \tag{3}$$

6. The all-solid-state battery according to claim 3, comprising:
a first intermediate layer between the positive electrode active material layer and the solid electrolyte layer; and a second intermediate layer between the negative electrode active material layer and the solid electrolyte layer.

7. The all-solid-state battery according to claim 6, wherein the first intermediate layer and the second intermediate layer contain at least one element selected from the group consisting of Li, Al, Ti, V, Zr, and P.

8. The all-solid-state battery according to claim 2, wherein the solid electrolyte layer contains a solid electrolyte, and the solid electrolyte contains, as a main component, any one of titanium aluminum lithium phosphate, lithium zirconium phosphate, and garnet-type zirconate.

9. The all-solid-state battery according to claim 8, wherein the positive electrode active material and the negative electrode active material are the same.

10. The all-solid-state battery according to claim 2, wherein a relationship between an area S1 of a portion of the negative electrode active material layer in contact with the solid electrolyte layer and an area S2 of a portion of the positive electrode active material layer in contact with the solid electrolyte layer satisfies the following Expression (3):

$$S1/S2>1 \qquad (3).$$

11. The all-solid-state battery according to claim 2, comprising:

a first intermediate layer between the positive electrode active material layer and the solid electrolyte layer; and a second intermediate layer between the negative electrode active material layer and the solid electrolyte layer.

12. The all-solid-state battery according to claim 11, wherein the first intermediate layer and the second intermediate layer contain at least one element selected from the group consisting of Li, Al, Ti, V, Zr, and P.

13. The all-solid-state battery according to claim 1, wherein the solid electrolyte layer contains a solid electrolyte, and the solid electrolyte contains, as a main component, any one of titanium aluminum lithium phosphate, lithium zirconium phosphate, and garnet-type zirconate.

14. The all-solid-state battery according to claim 1, wherein a relationship between an area S1 of a portion of the negative electrode active material layer in contact with the solid electrolyte layer and an area S2 of a portion of the positive electrode active material layer in contact with the solid electrolyte layer satisfies the following Expression (3):

$$S1/S2>1 \qquad (3).$$

15. The all-solid-state battery according to claim 1, comprising:

a first intermediate layer between the positive electrode active material layer and the solid electrolyte layer; and a second intermediate layer between the negative electrode active material layer and the solid electrolyte layer.

16. The all-solid-state battery according to claim 15, wherein the first intermediate layer and the second intermediate layer contain at least one element selected from the group consisting of Li, Al, Ti, V, Zr, and P.

* * * * *